Jan. 20, 1948. T. L. FAWICK 2,434,761
ASSEMBLY FOR BRAKES OR CLUTCHES
Filed Dec. 9, 1944 2 Sheets-Sheet 1

INVENTOR.
THOMAS L. FAWICK
BY Willard D. Eakin
attorney

Jan. 20, 1948.    T. L. FAWICK    2,434,761
ASSEMBLY FOR BRAKES OR CLUTCHES
Filed Dec. 9, 1944    2 Sheets-Sheet 2

INVENTOR.
THOMAS L. FAWICK
BY Willard D. Eakin
Attorney

Patented Jan. 20, 1948

2,434,761

UNITED STATES PATENT OFFICE 2,434,761

ASSEMBLY FOR BRAKES OR CLUTCHES

Thomas L. Fawick, Akron, Ohio, assignor to The Fawick Airflex Company, Inc., a corporation of Indiana Application December 9, 1944, Serial No. 567,483

7 Claims. (Cl. 188—152)

1

This invention relates to torque-sustaining clutches and brakes, of the types in which engagement and disengagement are effected by charging and venting a fluid-distensible member, usually annular, and with or without a set of friction blocks or wear shoes providing its engagement face.

My chief objects are to provide an improved construction adapted for easy and economical manufacture, assembly and disassembly; to avoid the presence of relatively moving parts, such as pins sliding radially in slots, exposed on an outer end face of the assembly; to provide easy adaptability of construction for transmission of the torque wholly through rigid members or, alternatively, through the fluid-distensible member, for cushioning of the torque; and to provide an improved sub-assembly comprising a fluid-distensible actuating member adapted to be moved axially with relation to a conical mating member for adjustment to compensate for wear, as in my U. S. Patent No. 2,205,521, or for effecting engagement without distension of the fluid-distensible member, as for manual actuation for general purposes or for parking of a vehicle, as in my co-pending application Ser. No. 528,139, filed March 25, 1944.

More specific objects will be manifest in the following description.

Figure 1:
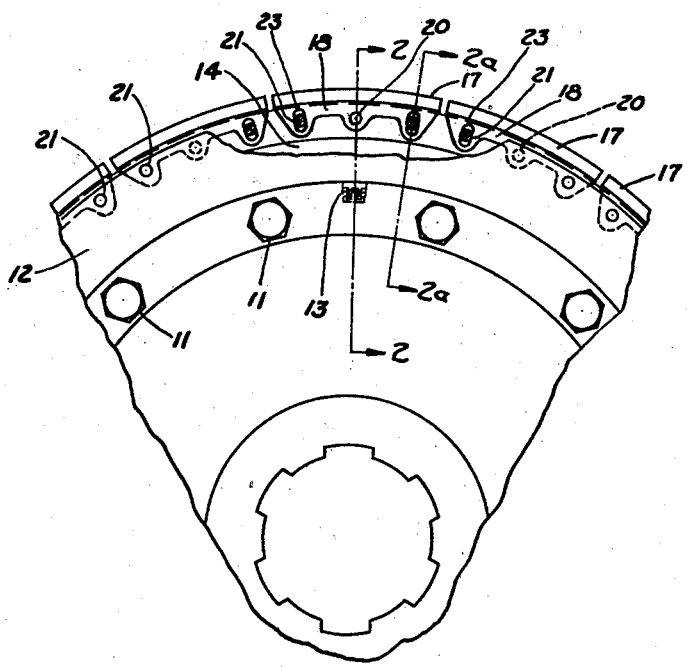
Fig. 1 is a fragmentary elevation, with parts broken away and sectioned on line 1—1 of Fig. 2, of a brake assembly embodying my invention in one of its preferred forms.
Figure 2:
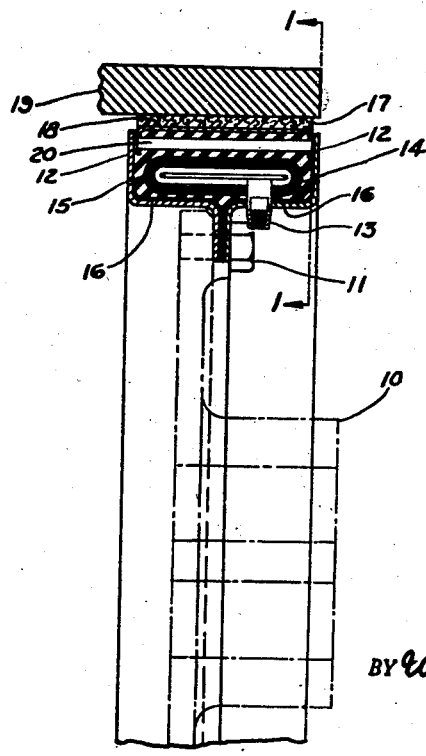
Fig. 2 is a section on line 2—2 of Fig. 1.
Figure 2A:
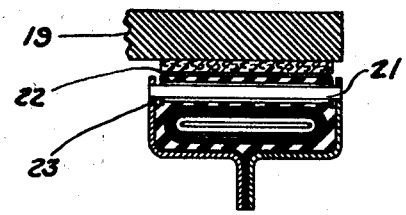
Fig. 2a is a section on line 2a—2a of Fig. 1.

Referring to the drawings, the embodiment shown in Figs. 1, 2 and 2a comprises a brake-hub member 10 having secured thereon by cap-screws 11, 11 a pair of channel defining annular metal stampings 12, 12 which are formed at the adjacent sides of their inner peripheries with inwardly projecting radial flanges apertured for reception of the cap-screws, and one of which is apertured to permit the extension through it of the inlet-outlet stem 13 of an annular, fluid-dis-

2 tensible bag 14 which is mounted in the channel defined by the two stampings 12.

The bag is of rubber or rubber-like material, preferably reinforced only by transversely disposed cords 15, so that the great-diameter of the bag can easily be increased for brake or clutch engagement.

For convenience of assembly and disassembly with secure anchorage of the bag in service, the annular base of the bag preferably is adhered by vulcanization to a pair of thin metal stampings 16, 16 (Fig. 2) adapted to fit within the stampings 12 and formed with inwardly extending radial flanges adapted to be clamped between the similar flanges of the members 12, 12 and formed with holes for the cap-screws 11.

Mounted upon the outer periphery of the bag is a circumferential series of wear-shoe assemblies each comprising a block of friction material 17 adhered to a saddle-like metal base member 18 having at its opposite sides inwardly projecting flanges adapted to straddle the outer periphery of the bag, the friction blocks 17 being adapted to be engaged with and retracted from the inner face of a brake-drum member 19 by distension and retraction of the bag.

For assuring withdrawal of the wear-shoes from the member 19 upon venting of the bag each wear-shoe assembly at its middle position is secured to the bag by a pin 20 extending with a snug fit through a hole in the substance of the bag and through the side flanges of the wear-shoe's base plate, the pin permissibly being held in place by peening of its ends.

For transmission of torque from the wear-shoes to the side-plate portion of the stampings 12 there is at each end of each wear-shoe assembly a pin 21 which extends through a hole 22 in the material of the bag and holes 23, 23 in the side flanges of the base plates 18, which holes are radially oblong to permit radial movement of the wear-shoe assemblies in relation to the pins the latter being anchored at their ends, in the side-plate members 12, as by peening of their ends.

When the holes 22 in the substance of the bag and the holes 23 in the side-flanges of the base plates 18 are of the same width the torque is sustained chiefly by metal-to-metal contact from the wear-shoes 17 to the side-plate members 12, but my invention is not wholly limited to that.

Preferably some clearance, as shown, is provided between the side-plate members 12 and the side-flanges of the base-plate members 18 so that binding or cramping of those members against each other is avoided, and each wear-shoe is permitted to seat uniformly throughout its extent against the member 19, and, when the assembly is used as a clutch, the weaving movement incident to angular shaft mis-alignment is permitted by lateral movement of the wear-shoe assemblies in relation to the side-plate members.

Figure 3:
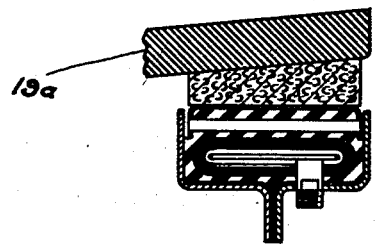
Fig. 3 is a corresponding section illustrating a modification.

The construction shown in Fig. 3 corresponds substantially to that just described except that the friction blocks are shaped for coaction with a conical outer brake member 19a although advanced and retracted in directions at right-angles to the axis of rotation.

Figure 4:
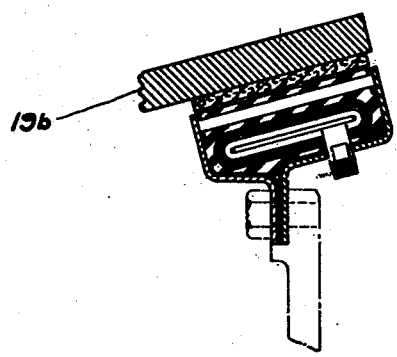
Fig. 4 is a corresponding section illustrating still another modification.

In the assembly shown in Fig. 4 the bag is given conical form and the parts are shaped and arranged for oblique movement of the blocks for engagement and disengagement.

Thus the present invention, as in Fig. 3 or Fig. 4, can be used in an assembly having advantages that are presented in my U. S. Patent No. 2,205,521, and in my co-pending application Ser. No. 528,139, filed March 25, 1944.

Other modifications are possible within the scope of the invention as defined by the appended claims.

I claim:

1. The combination of two relatively rotatable and approximately coaxial structures adapted for frictional, torque-sustaining engagement with each other, one of the same comprising a fluid-distensible member for effecting the engagement and having a thick distending wall comprising rubber-like material, a pair of side-plate members defining a channel in which said distensible member is seated, and a pin having its end portions fixedly mounted in said side-plate members respectively and extending through a hole traversing the aforesaid wall, said hole being, unobstructedly, of greater radial dimension than said pin to permit radial distending movement of said wall.

2. The combination of two relatively rotatable and approximately coaxial structures adapted for frictional, torque-sustaining engagement with each other, one of the same comprising a fluid-distensible member for effecting the engagement and having a thick distending wall comprising rubber-like material, a pair of side-plate members defining a channel in which said distensible member is seated, a pin having its end portions fixedly mounted in said side-plate members respectively and extending through a hole traversing the aforesaid wall, said hole being, unobstructedly, of greater radial dimension than said pin to permit radial distending movement of said wall, and a friction-block structure secured on said wall for engagement with and retraction from the other rotary structure by distension and retraction of said fluid-distensible member.

3. The combination of two relatively rotatable and approximately coaxial structures adapted for frictional, torque-sustaining engagement with each other, one of the same comprising a fluid-distensible member for effecting the engagement and having a thick distending wall comprising rubber-like material, a pair of side-plate members defining a channel in which said distensible member is seated, a pin having its end portions fixedly mounted in said side-plate members respectively and extending through a hole traversing the aforesaid wall, said hole being, unobstructedly, of greater radial dimension than said pin to permit radial distending movement of said wall, and a friction-block structure secured on said wall for engagement with and retraction from the other rotary structure by distension and retraction of said fluid-distensible member, the friction-block structure comprising a saddle-shaped base member straddling the said wall, a pin extending through said wall and having its end portions anchored to said base member, and a block of frictional material secured on said base member.

4. The combination of two relatively rotatable and approximately coaxial structures adapted for frictional, torque-sustaining engagement with each other, one of the same comprising a fluid-distensible member for effecting the engagement and having a thick distending wall comprising rubber-like material, a pair of side-plate members defining a channel in which said distensible member is seated, and a pin having its end portions fixedly mounted in said side-plate members respectively and extending through a hole traversing the aforesaid wall, said hole being, unobstructedly, of greater radial dimension than said pin to permit radial distending movement of said wall, the other rotary member having an engagement face oblique with relation to its axis of relative rotation and said wall being likewise oblique for distension in a direction substantially normal to said engagement face.

5. The combination of two relatively rotatable and approximately coaxial structures adapted for frictional, torque-sustaining engagement with each other, one of the same comprising a fluid-distensible member for effecting the engagement and having a thick distending wall comprising rubber-like material, a pair of side-plate members defining a channel in which said distensible member is seated, a pin having its end portions fixedly mounted in said side-plate members respectively and extending through a hole traversing the aforesaid wall, said hole being, unobstructedly, of greater radial dimension than said pin to permit radial distending movement of said wall, and a friction-block structure secured on said wall for engagement with and retraction from the other rotary structure by distension and retraction of said fluid-distensible member, said other rotary structure having an engagement face oblique with relation to its axis of relative rotation and said friction-block structure having a face likewise oblique for engagement with the said oblique face of said other rotary structure.

6. The combination of two relatively rotatable and approximately coaxial structures adapted for frictional, torque-sustaining engagement with each other, one of the same having an engagement face oblique with relation to its axis of relative rotation, and the other comprising a fluid-distensible member having substantially the resilient deformability of vulcanized soft-rubber and distensible in a direction at right-angles to the axis of its relative rotation, and a block of frictional material mounted on said distensible member to be moved in said direction by distension of said member and formed with a similarly oblique face for engagement with the first mentioned oblique face, the assembly including block-anchoring means having a portion interlocked with the substance of said fluid-distensible member for retraction of the block upon contraction of the fluid-distensible member.

7. The combination of two relatively rotary and approximately coaxial structures adapted for frictional, torque-sustaining engagement with each other, an annular, fluid-distensible member comprising rubber-like material for effecting such engagement, and an annular metal base-structure adhered to said fluid-distensible member, said base structure comprising a pair of metal members adhered to a periphery of said distensible member and formed with face-to-face peripheral attachment portions having registered apertures for reception of securing means and a second pair of metal members embracing the first pair and formed with peripheral attachment portions apertured in registry with the first mentioned apertures.

THOMAS L. FAWICK.

REFERENCES CITED

The following references are of record in the file of this patent:

UNITED STATES PATENTS

| Number | Name | Date |
|---|---|---|
| 2,251,443 | Fawick | Aug. 5, 1941 |
| 2,252,128 | Kraft | Aug. 12, 1941 |
| 1,184,545 | Longley | May 23, 1916 |